(12) United States Patent
Shields et al.

(10) Patent No.: US 10,946,590 B2
(45) Date of Patent: Mar. 16, 2021

(54) INJECTION MOLDED ASSEMBLY AND METHOD OF JOINING INJECTION MOLDED PARTS

(71) Applicant: FAURECIA INTERIOR SYSTEMS, INC., Auburn Hills, MI (US)

(72) Inventors: Scott Shields, Auburn Hills, MI (US); Brett Schnur, Auburn Hills, MI (US); Brad Kusky, Auburn Hills, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 804 days.

(21) Appl. No.: 15/633,048

(22) Filed: Jun. 26, 2017

(65) Prior Publication Data

US 2018/0370151 A1 Dec. 27, 2018

(51) Int. Cl.
*B29C 65/50* (2006.01)
*B29C 65/48* (2006.01)
(Continued)

(52) U.S. Cl.
CPC .... *B29C 66/1248* (2013.01); *B29C 45/14311* (2013.01); *B29C 45/14508* (2013.01);
(Continued)

(58) Field of Classification Search
CPC .......... B29C 65/5021; B29C 45/14508; B29C 65/5057; B29C 45/1657; B29C 66/54; B29C 66/223; B29C 45/14311; B29C 66/1248; B29C 65/7415; B29C 2045/1668; B29C 2045/14516; B29C 2045/1664; B29C 65/4825; B29C 45/40; B29C 66/05; B29C 66/10; B29C 66/20; B29C 66/22; B29L 2031/3008; B29L 2031/3014; Y10T 428/24033; Y10T 428/17; Y10T 428/19;
(Continued)

(56) References Cited

U.S. PATENT DOCUMENTS 5,205,895 A * 4/1993 Hohman, Jr. ....... B29C 65/5057
428/420
5,282,673 A * 2/1994 Koyama ............. B29C 66/1142
301/10.1
(Continued)

FOREIGN PATENT DOCUMENTS

WO 2013012973 A2 1/2013

*Primary Examiner* — David Sample
*Assistant Examiner* — Donald M Flores, Jr.
(74) *Attorney, Agent, or Firm* — LKGlobal | Lorenz & Kopf, LLP

(57) ABSTRACT

An assembly of joined injection molded parts and a method for joining injection molded parts is disclosed herein. The assembly includes, but is not limited to, a first injection molded part having a first bonding area. The first bonding area has a plurality of first fingers extending from a surface of the first bonding area. The assembly further includes a second injection molded part having a second bonding area. The second bonding area corresponds in shape to the first bonding area and has a plurality of second fingers that extend from a surface of the second bonding area. The assembly includes an adhesive tape arranged between the plurality of first fingers and the plurality of second fingers. The adhesive tape is configured to bond the first injection molded part to the second injection molded part.

13 Claims, 4 Drawing Sheets

(51) Int. Cl.

| | |
|---|---|
| *B29C 65/74* | (2006.01) |
| *B29C 65/00* | (2006.01) |
| *B29C 45/14* | (2006.01) |
| *B29C 45/16* | (2006.01) |
| *B32B 3/06* | (2006.01) |
| *B32B 3/30* | (2006.01) |
| *B29L 31/30* | (2006.01) |
| *B32B 7/12* | (2006.01) |

(52) U.S. Cl.
CPC ...... *B29C 45/1657* (2013.01); *B29C 65/5057* (2013.01); *B29C 66/223* (2013.01); *B29C 66/54* (2013.01); *B32B 3/06* (2013.01); *B32B 3/30* (2013.01); *B29C 65/4825* (2013.01); *B29C 2045/14516* (2013.01); *B29C 2045/1664* (2013.01); *B29C 2045/1668* (2013.01); *B29L 2031/3008* (2013.01); *B29L 2031/3014* (2013.01); *B32B 7/12* (2013.01)

(58) Field of Classification Search
CPC ......... Y10T 428/192; B32B 3/06; B32B 3/30; B32B 7/12
USPC .......................................... 428/33, 53, 57, 58
See application file for complete search history.

(56) References Cited

U.S. PATENT DOCUMENTS

| | | |
|---|---|---|
| 6,544,643 B1 | 4/2003 | Hyde et al. |
| 6,641,096 B2 | 11/2003 | Johansson et al. |
| 6,653,408 B1 | 11/2003 | Clair |
| 6,905,100 B2 | 6/2005 | Franck et al. |
| 2007/0275240 A1 | 11/2007 | Krawinkel |
| 2008/0251201 A1 | 10/2008 | Sikkel et al. |

\* cited by examiner

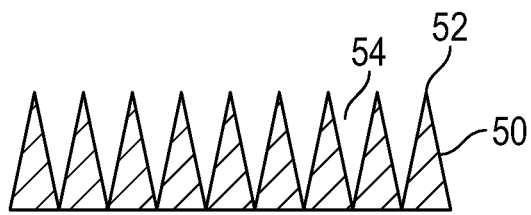
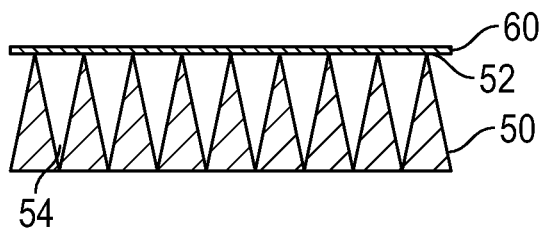
FIG. 5A                FIG. 5B
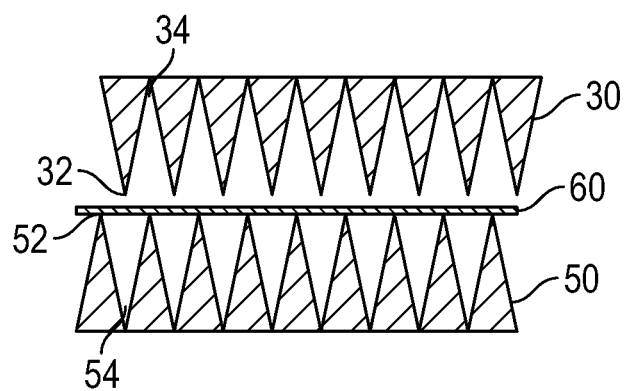
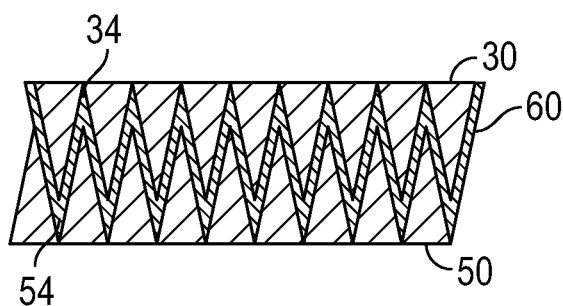
FIG. 5C                FIG. 5D

INJECTION MOLDED ASSEMBLY AND METHOD OF JOINING INJECTION MOLDED PARTS

TECHNICAL FIELD

The technical field generally relates to the joining of separate injection molded parts to one another, and more particularly relates to using fastening tape in a finger joint to join two injection molded parts.

BACKGROUND

The assembly of an automobile entails the assembly of multiple injection molded parts to form interior panels of the cabin. Many of the components such as door panels or instrument panels have several injection molded parts that are joined together to form the completed panel. Conventionally, plastic injection molded parts are joined together with fasteners, ultrasonic welding, or other known techniques. In these cases, the plastic injection molded parts are held in communication with one another and then fastened together or welded along a bonding surface.

Adhesive tapes and structural adhesives offer advantages over conventional plastic joining techniques by reducing manufacturing costs by reducing the number of mechanical fasteners or weld procedures. Furthermore, adhesive tapes and structural adhesives can be used to join dissimilar parts, such as those with different chemical compositions that may have otherwise proved challenging to ultrasonic welding. However, adhesive tape and structural adhesives cannot simply be used in place of conventional plastic joining techniques as adhesives are limited by the surface available between the parts that are be joined to one another. In situations where there is not enough surface area, adhesives are not strong enough to create the bond necessary to hold low surface energy interior components together during extreme loading situations, such as during an automobile crash. Low surface energy components are commonly used in the interior and laminating industries. This phrase generally refers to materials that typically would require a surface treatment such as flame, plasma or corona to increase the surface tension, increasing the adhesion. The molecular sites to bond to on the surface of the material are low in number, which therefore leads to low bond strength between the two components with conventional adhesives.

Pressure sensitive adhesives for use in structural bonding have been disclosed in, for example, U.S. Patent Application Publication no. 2008/0251201 to Sikkel et al. (hereinafter, "the Sikkel Application"). The Sikkel Application describes a pressure sensitive adhesive designed to adhere structural components of a motor vehicle to one another. The structural adhesive has multiple layers that are activated when the parts are pressed together. Thus, the Sikkel Application's adhesive tape permits the components to be joined together without using welds or rivets.

Sikkel's solution, however, gives rise to a significant problem with respect to joining plastic interior components. As admitted by Sikkel, the strength of the bond between the components is directly related to the surface area of the bonding area. For example, the strength of the bond decreases as the surface area of the bonding area decreases. This is generally not an issue when dealing with large, structural components, such as those of an automobile frame. However, on smaller injection molded plastic interior components, in which the bonding area is comparatively small, Sikkel's adhesive tape may not provide sufficient bonding strength to join the injection molded parts as detailed above. Creating a physically larger bonding surface is not always desirable as there may not be the space necessary on the components without compromising the aesthetic appearance of the interior panel.

Accordingly, while Sikkel's solution is acceptable under some circumstances, it is not helpful in all circumstances and hence Sikkel leaves room for improvement. It would be desirable to provide a way to join injection molded parts that have relatively low overlapping surface areas without relying on the costly or time consuming or ill-suited prior art methods described above. Furthermore, other desirable features and characteristics will become apparent from the subsequent detailed description and the appended claims, taken in conjunction with the accompanying drawings and the foregoing technical field and background.

SUMMARY

An assembly of injection molded parts for a vehicle and a method for assembling injection molded parts are disclosed herein.

In a first non-limiting embodiment, the assembly includes, but is not limited to, a first injection molded part having a first bonding area. The first bonding area has a plurality of first fingers extending from a surface of the first bonding area. The assembly further includes a second injection molded part having a second bonding area. The second bonding area has a shape that corresponds to the first bonding area and has a plurality of second fingers extending from a surface of the second bonding area. The assembly further includes an adhesive tape arranged between the plurality of first fingers and the plurality of second fingers. The adhesive tape is configured to bond the first injection molded part to the second injection molded part.

In another non-limiting embodiment, a method is disclosed for assembling injection molded parts. The method includes, but is not limited to injection molding a first part with a plurality of first fingers extending from a surface of a first bonding area. The method further includes injection molding a second part with a plurality of second fingers extending from a surface of a second bonding area. The method further includes placing adhesive tape across a top surface of either the plurality of first fingers or the plurality of second fingers and pressing the plurality of first fingers and the plurality of second fingers into engagement with the adhesive tape disposed therebetween

DESCRIPTION OF THE DRAWINGS

One or more embodiments will hereinafter be described in conjunction with the following drawing figures, wherein like numerals denote like elements.

FIGS. 5A-5D depict joining of the first and second fingers using the adhesive tape from an unassembled state to an assembled state.

DETAILED DESCRIPTION

Figure 1:
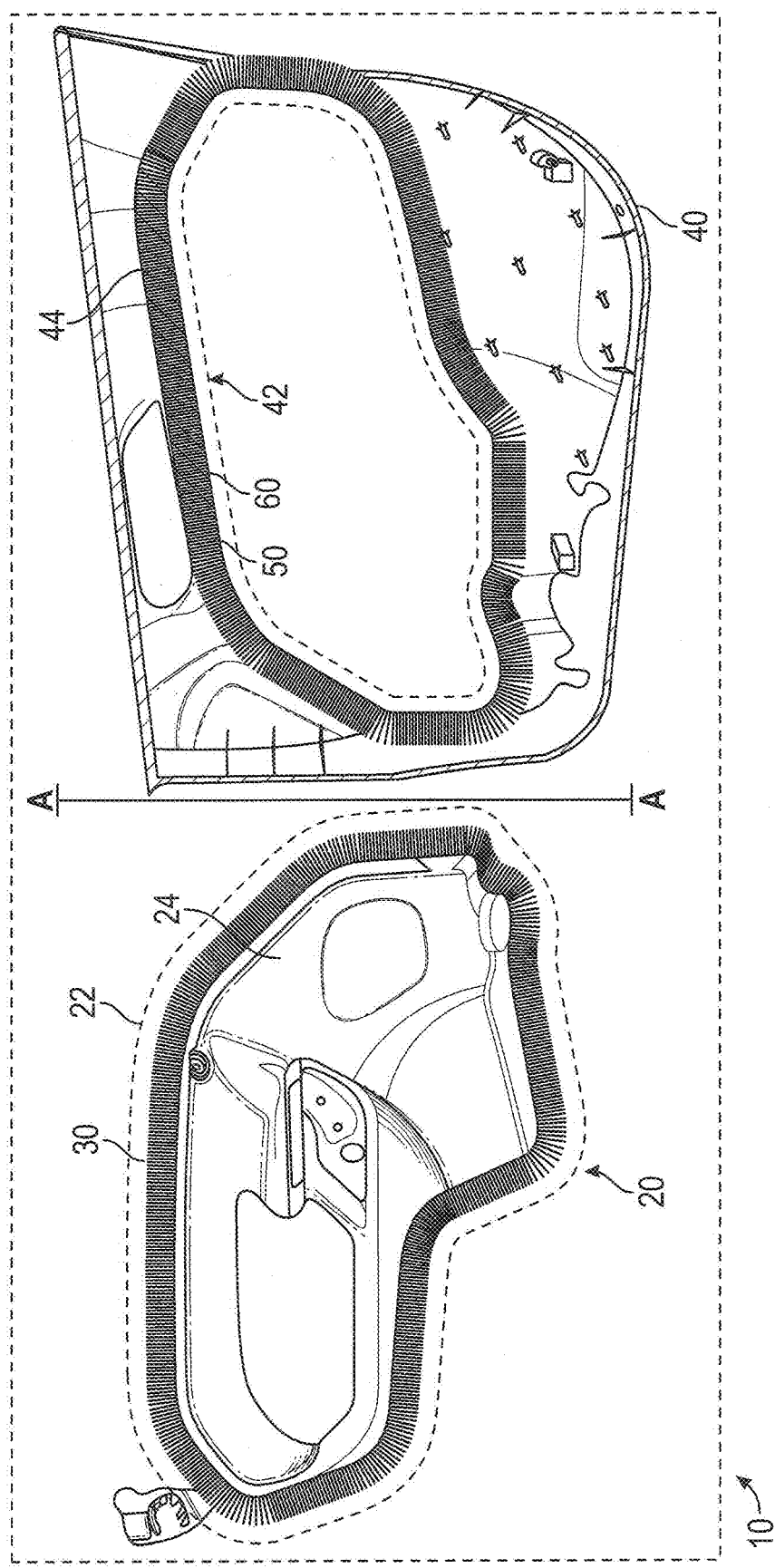
FIG. 1 is a perspective view illustrating two injection molded parts to be joined into an assembly in accordance with the teachings of the present disclosure.

The following detailed description is merely exemplary in nature and is not intended to limit application and uses. Furthermore, there is no intention to be bound by any expressed or implied theory presented in the preceding technical field, background, brief summary or the following detailed description.

An assembly of injection molded parts for a vehicle is disclosed herein. The assembly of the present disclosure includes a first injection molded part having a first bonding area. The first bonding area has a plurality of first fingers extending from a surface of the first bonding area. The assembly includes a second injection molded part having a second bonding area. The second bonding area corresponds in shape to the first bonding area and has a plurality of second fingers extending from a surface of the second bonding area. The assembly includes an adhesive tape arranged between the first and second fingers of the first and second injection molded parts. The adhesive tape is configured to bond the first injection molded part to the second injection molded part. In this way, the disclosed assembly increases the surface area of the first and second bonding areas to allow for a robust bond that is lightweight and easy to manufacture.

An additional advantage of the assembly disclosed herein is that the first fingers define first peaks and first valleys and the second fingers define second peaks and second valleys. In an assembled state, the first peaks engage the second valleys and the second peaks engage the first valleys. With respect to the present disclosure, the engagement of the peaks and valleys of the fingers of the injection molded parts increase the surface area of the bonding area between the two parts.

An additional advantage of the assembly disclosed herein is that, in some embodiments, the adhesive tape is configured to stretch into the first and second valleys when the first and second injection molded parts are assembled from an unassembled state to the assembled state. By stretching into the peaks and valleys of the fingers, the adhesive tape engages the entire surface of the first and second part bonding surfaces to provide increased bonding strength. Thus, the assembly may ensure engagement of the adhesive tape across the entire bonding surface.

An additional advantage of the assembly disclosed herein is that, in some embodiments, the first fingers and the second fingers form a finger joint in the assembled state. A "finger" or "comb" joint is one in which the fingers from one part engage the fingers of another part to join the two parts together. As the parts are pushed together, friction between the fingers further helps join the two parts to each other.

An additional advantage of the assembly disclosed herein is that, in some embodiments, the first and second fingers extend along a width of the first and second bonding areas. By extending the fingers along the entire width of the bonding areas, the effective surface area of the bonding area is increased. Increasing the surface area of the bonding area improves the bond strength between the parts and further increases the strength of the finger joint.

An additional advantage of the assembly disclosed herein is that, in some embodiments, a size of the first and second fingers is based upon at least one of an adhesive tape bonding strength, an available bonding area, a required bonding strength, an injection molded part property, or a combination thereof. By configuring the size of the fingers base on physical design parameters, the assembly can be strengthened to meet design criteria, provide improved aesthetics, take advantage of specific adhesive tapes, or conform with injection molded material properties. Certain design parameters will require stronger bonds, in which case larger and wider fingers will be necessary, or stronger tape will need to be used, for example. In this way, the physical size and shape of the fingers are a design consideration that can be tailored to specific applications.

An additional advantage of the assembly disclosed herein is that, in some embodiments, the first and second fingers have a complimentary triangular cross-section. As detailed above, the fingers engage one another as the parts are pressed together from the unassembled state to the assembled state. Fingers with a triangular cross-section allow for the two parts to more easily mate with one another such that the peaks from one part align with the valleys of the other part. In addition, triangular fingers are relatively easy to mold and manufacture as compared with other geometric configurations. This makes the assembly easier to construct.

An additional advantage of the assembly disclosed herein is that, in some embodiments, the triangular cross-section of the first and second fingers have a base length (X), a side length (Y), a base width (Z), and a height (H), as will be described with respect to the equations below. In this way, the physical properties of the first and second fingers are calculated based upon the design requirements. The physical properties of the fingers are related to one another in such a way that the correct finger size may reliably calculated for various assemblies.

An additional advantage of the assembly disclosed herein is that, in some embodiments, the assembly has a plurality of first finger sections about the first bonding area, where each first finger section has first fingers aligned with each other within the same first finger section. The assembly further has a plurality of second finger sections about the second bonding area, where each second finger section has second fingers aligned with each other within the same second finger section. In this way, in situations where the bonding area is curved or otherwise not straight edged, the first and second bonding areas are divided up into first and second finger sections. The fingers within each individual section are aligned with one another, while fingers in different sections may not be aligned with one another. This allows for improved alignment between the first and second injection molded parts of the assembly.

An additional advantage of the assembly disclosed herein is that, in some embodiments, the assembly has first fingers of each first finger section that are aligned with corresponding second fingers of each second finger section.

An additional advantage of the assembly disclosed herein is that, in some embodiments, the assembly has a finger direction of the first and second fingers that is based on a position of the first and second finger about the first and second bonding area. For example, in situations where the bonding area is a regular or even curve, rather than having sections of aligned fingers, the fingers gradually adjust their alignment around the curve. In a non-limiting example, the fingers around an arc may be aligned radially relative to a center of the arc. In a non-limiting example, the finger direction extends perpendicularly from an inner bonding area side so that in straight sections, the fingers are all aligned perpendicularly to an inner bonding area side.

An additional advantage of the assembly disclosed herein is that, in some embodiments, the assembly spaces the first fingers apart from adjacent first fingers in the first bonding area and the second fingers are spaced apart from adjacent second fingers in the second bonding area. This allows for indicia or other alignment aiding features to be placed between the fingers. The use of such indicia may allow for precise alignment between the first and second parts while not dramatically reducing the surface area such that the bond strength unduly weakens.

A greater understanding of the assembly described above, as well as a method for assembling injection molded parts may be obtained through a review of the illustrations accompanying this application together with a review of the detailed description that follows.

FIG. 1 is a perspective view illustrating an embodiment of an assembly 10 of injection molded parts 20, 40 in accordance with the teachings of the present disclosure. Assembly 10 has a first injection molded part 20 and a second injection molded part 40 shown in an unassembled state for sake of understanding. Although the context of the discussion herein is automotive in nature, it should be understood that assembly 10 is not limited to use only in automotive applications. Rather, there are a wide range of uses for assembly 10 including, but not limited to, use in the assemblies of watercraft, recreational vehicles, aircraft, spacecraft, rail driven vehicles, as well as any other type of vehicle. Additionally, assembly 10 has uses in industries other than vehicle-related industries. For example, and without limitation, assembly 10 may be used to join injected molded components 20, 40 in furniture, construction tools, or other industries in which high strength bonding is needed.

The first injection molded part 20 has a first bonding area 22. The first bonding area 22 encapsulates the perimeter of the first injection molded part 20 and represents the portion of the first injection molded part 20 that will interface with the second injection molded part 40. The first bonding area 22 has a plurality of first fingers 30 that extend from a surface 24 of the first bonding area 22.

The second injection molded part 40 has a second bonding area 42. The second bonding area 42 encapsulates the perimeter of the second injection molded part 40 and represents the portion of the second injection molded part 40 that will interface with the first injection molded part 20. The second bonding area 42 has a plurality of second fingers 50 that extend from a surface 44 of the second bonding area 42.

While the first injection molded part 20 and the second injection molded part 40 are described as being formed by injection molding, one skilled in the art will appreciate that the first injection molded part 20 and the second injection molded part 40 need not be injection molded and that other materials may be used without departing from the spirit of the present disclosure. Non limiting examples include thermoformed parts, 3D printed parts, machined parts, and compression molded parts.

The second bonding area 42 has a shape that corresponds to the shape of the first bonding area 22. In the non-limiting example of FIG. 1, the first and second injection molded parts 20, 40 are depicted to be assembled in a clamshell type arrangement over the line A-A. Stated differently, the first bonding area 22 and the second bonding area 42 have the same general shape mirrored over the line A-A. The representation of the first bonding area 22 and the second bonding area 42 in FIG. 1 is not meant to be limiting with respect to the shape and is used to depict the necessary similarity between the shapes of the first bonding area 22 and the second bonding area 42, as is known to those skilled in the art.

The assembly 10 further includes an adhesive tape 60. In a non-limiting embodiment, in the unassembled state, the adhesive tape 60 is paid across the fingers 30, 50 of one of the first or second injection molded parts 20, 40. In an assembled state of the assembly 10, the adhesive tape 60 is arranged between the first and second fingers 30, 50 of the first and second injection molded parts 20, 40. In this way, the adhesive tape 60 is configured to bond the first injection molded part 20 to the second injection molded part 30.

Figure 2:
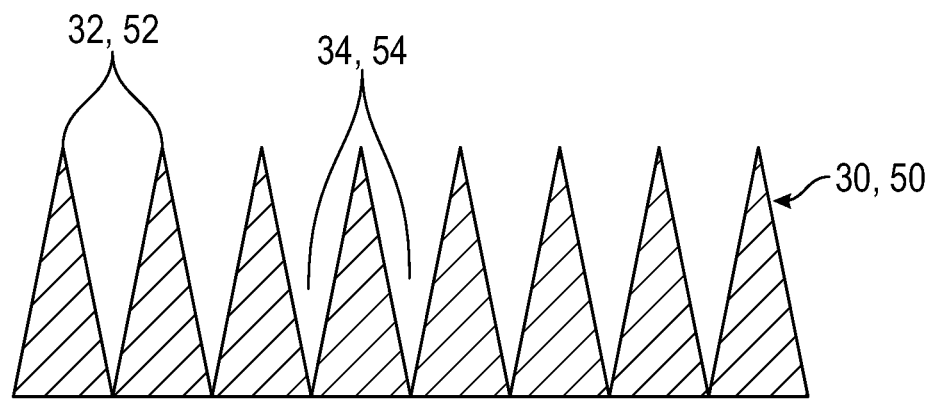
FIG. 2 is cross-sectional view of the fingers used in the bonding area.
Figure 3:
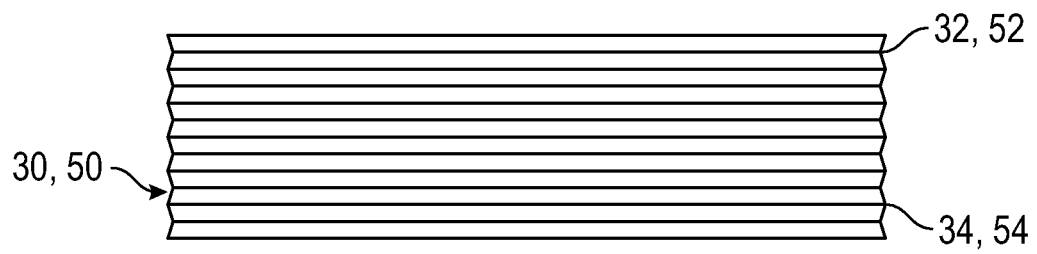
FIG. 3 is top perspective view of the fingers used in the bonding area.

The structure of the fingers 30, 50 will now be discussed with reference to FIGS. 2-4, and with continued reference to FIG. 1. An exemplary cross-sectional view of the fingers 30, 50 is shown in FIG. 2 and an exemplary top perspective view of the fingers 30, 50 is shown in FIG. 3. In a non-limiting embodiment, the fingers 30, 50 have peaks 32, 52, and valleys 34, 54. As will be described later, in the assembled state, the first peaks 32 engage the second valleys 54 and the second peaks 52 engage the first valleys 34.

In a non-limiting embodiment, the fingers 30, 50 have a complimentary triangular cross-section. As detailed above, triangular fingers allow for the first and second fingers 30, 50 to easily mate with one another when pressed into engagement. In addition, the triangular shape is easily manufactured using injection molding techniques. While triangular shaped fingers are depicted throughout the Figures, one skilled in the art will appreciate that other complimentary shapes may be used for the first and second fingers 30, 50 without departing from the spirit of the invention. Non-limiting examples of finger cross-sectional shapes include, but are not limited to, rectangular, rounded, or different triangular shape. One skilled in the art will further appreciate that the shape of the first fingers 30 and the second fingers 50 need to be complimentary to one another. For example, rounded first fingers 30 would be received in rounded trough shaped second fingers 50.

In a non-limiting embodiment, the peaks 32, 52 of the first and second fingers 30, 50 are rounded. In this way, the first and second fingers 30, 50 may be easier to be brought into engagement with one another.

As shown in FIG. 3, the peaks 32, 52 and valleys 34, 54 run the entire width of the part bonding areas 22, 42. In a non-limiting embodiment, the peaks 32, 52 and valleys 34, 54 do not run the entire width of the part bonding areas 22, 42 and are surrounded by indicia or locating features in the part bonding areas 22, 42.

Figure 4:
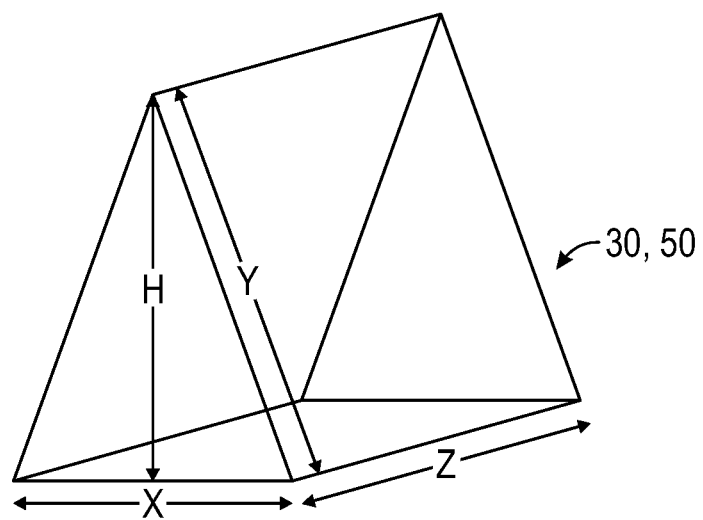
FIG. 4 is a schematic view of one of the fingers from FIGS. 2-3.

With reference now to FIG. 4 and with continued reference to FIGS. 1-3, the dimensions of a finger 30, 50 are depicted herein. As detailed above, in a non-limiting embodiment, the fingers 30, 50 have a triangular cross-section. The fingers 30, 50 have a base length (X), a side length (Y), a base width (Z), and a height (H). In a non-limiting embodiment, the base length (X), side length (Y), base width (Z), and height (H) are design choices selected based upon at least one of an adhesive tape 60 bonding strength, an available bonding area, a required bonding strength, an injection molded part property, or a combination thereof.

In a non-limiting example, the base length (X), side length (Y), base width (Z), and height (H) are calculated according to the following equations:

$$\frac{S_w}{S_t} = S_R \tag{1}$$

$$\sigma_w \times S_R = \sigma_{min} \tag{2}$$

-continued $$\frac{\sigma_{min}}{\sigma_t} = R \quad (3)$$

Where:
$S_w$: Surface used for ultrasonic welding
$S_t$: Surface available for adhesive taping
$S_R$: Surface ratio
$\sigma_w$: Resistance of the ultrasonic weld
$\sigma_t$: Resistance of the adhesive tape
$\sigma_{min}$: Minimum resistance required by the tape in N/mm²
R: Ratio weld/tape In a non-limiting example, the following values were used in Equations 1-3 to determine how much surface area is required in order for adhesive tape 60 to match the performance of ultrasonic welding ribs.
$S_w$=14205 mm²
$S_t$=189700 mm²
$\sigma_w$=14.3 N/mm²
$\sigma_t$=60 N/mm²

Using these values in Equations 1-3 yields that since $\sigma_{min} > \sigma_t$, the surface area required for taping must increase, therefore the fingers 30, 50 are used to increase the surface area. The following equations were used to determine exemplary dimensions for the Fingers 30, 50 as shown in FIG. 4:

$$R \times S_w = S_t \quad (4)$$

$$S_x = Z \times L_x \quad (5)$$

$$R \times L_w = L_t \quad (6)$$

$$L_w = \Delta \times X \quad (7)$$

$$L_t = \Delta \times Y \quad (8)$$

$$R \times X \times \Delta = Y \times \Delta \quad (9)$$

$$X \times R = Y \quad (10)$$

$$H = \sqrt{Y^2 - \left(\frac{X}{2}\right)^2} \quad (11)$$

$$H = \Sigma T_p - (T_t + \Sigma T_{min}) \quad (12)$$

$$X = \frac{H}{2\sqrt{4R-1}} \quad (13)$$

$$A = \frac{\Sigma T_p - (T_t + \Sigma T_{min})}{2 \times \sqrt{\left[4 \times \left(\frac{\sigma_w \times S_w}{\sigma_t \times S_t}\right)\right] - 1}} \quad (14)$$

Where:
X: Base length in mm
Y: Side length in mm
H: Height in mm
Z: Base width=12.5 mm
$T_p$: Thickness of the part=3.5 mm (both)
$T_t$: Thickness of the adhesive tape=0.3 mm
$T_{min}$: Minimum thickness needed on the part=0.6 mm (both)
$L_w$: Length of welding
$L_t$: Length for adhesive taping
Δ: amount of length divisions For Equation 3, meaning to meet the requirement of Equation 4 with Z constant and Equation 5, we consider Equation 6. And where Equation 7, then Equation 8, therefore Equation 9 and so Equation 10. Now with Equation 11 and knowing Equation 12, then extracting X gives Equation 13 with denominator to Equation 14.

In a non-limiting embodiment, the base length (X), side length (Y), base width (Z), and height (H) are calculated according to Equation 1-Equation 14. In a non-limiting embodiment, the progression from Equation 1-Equation 14 forms a finger determining algorithm. Stated differently, the finger determining algorithm is used to determine the physical characteristics of the fingers, mainly the base length (X), side length (Y), base width (Z), and height (H), based on the factors and variables detailed above.

With reference now to FIGS. 5A-5D and with continued reference to FIGS. 1-4, the bonding of the first and second parts 20, 40 between the unassembled state and the assembled state will be described. In FIG. 5A, the second fingers 50 are depicted in the unassembled state. The second fingers 50 have second peaks 52 and second valleys. In FIG. 5B, the adhesive tape 60 is laid across the peaks 52 of the fingers 50. In FIG. 5C, the first fingers 30 of the first part 20 are positioned proximate to the second fingers 50 which are overlaid with the adhesive tape 60. The first and second fingers 30, 50 are pressed together to result in the assembled state as shown in FIG. 5D. As shown in FIG. 5D, the adhesive tape 60 is pressed by the peaks 32, 52 into the corresponding valleys 34, 54 to bond the first and second fingers 30, 50 to one another.

Figure 6:
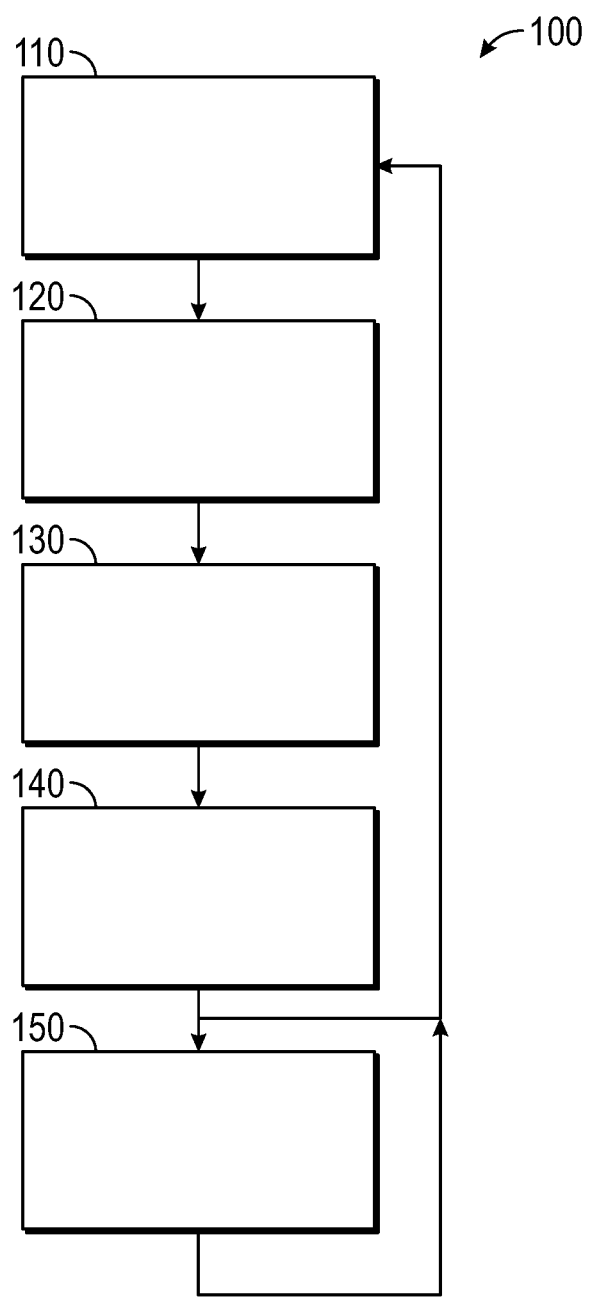
FIG. 6 is a block diagram illustrating the steps of a method for assembling the injection molded parts of FIG. 1.

FIG. 6 is a block diagram illustrating the steps of a method 100 for assembling injection molded parts (see FIGS. 1-5). The method 100 starts at block 110 and injection molds a first part with a plurality of first fingers extending from a surface of a first bonding area. The method 100 proceeds to block 120 and injection molds a second part with a plurality of second fingers extending from a surface of a second bonding area. Following 120, the method 100 proceeds to 130 and places adhesive tape across a top surface of either the plurality of first fingers or the plurality of second fingers. The method 100 then proceeds to 140 and presses the plurality of first fingers and the plurality of second fingers into engagement with the adhesive tape disposed therebetween. Following 140, the method 100 returns to 110 to assemble additional injection molded parts.

In a non-limiting embodiment, the method 100 further includes 150 and following 140, presses the plurality of first fingers and the plurality of second fingers into engagement such that the adhesive tape stretches into a plurality of first valleys corresponding to the plurality of first fingers and a plurality of second valleys corresponding to the plurality of second fingers when the first injection molded part and second injection molded part are assembled from an unassembled state to an assembled state.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. An assembly of injection molded parts for a vehicle, the assembly comprising:
   a first injection molded part having a first bonding area, the first bonding area having a plurality of first fingers extending from a surface of the first bonding area;
   a second injection molded part having a second bonding area, the second bonding area corresponding in shape to the first bonding area and having a plurality of second fingers extending from a surface of the second bonding area; and
   an adhesive tape arranged in a stretched condition under tensile stress between the plurality of first fingers and the plurality of second fingers to bond the first injection molded part and the second injection molded part together, wherein the adhesive tape in the stretched condition has a greater surface area compared to the adhesive tape in an unstretched condition to enhance engagement with the surfaces of the first and second bonding areas including the plurality of first fingers and the plurality of second fingers to increase bonding strength.

2. The assembly of claim 1, wherein the plurality of first fingers define a corresponding plurality of first peaks and a corresponding plurality of first valleys and the plurality of second fingers define plurality of second peaks and plurality of second valleys, wherein the plurality of first peaks engage the plurality of second valleys and the plurality of second peaks engage the plurality of first valleys including with the adhesive tape in the stretched condition disposed therebetween.

3. The assembly of claim 2, wherein the plurality of first fingers and the plurality of second fingers form a finger joint.

4. The assembly of claim 1, wherein the plurality of first fingers and the plurality of second fingers extend along a width of the first bonding area and a width of the second bonding area.

5. The assembly of claim 1, wherein a size of the plurality of first fingers and a size of the plurality of second fingers is based upon at least one of an adhesive tape bonding strength, an available bonding area, a required bonding strength, an injection molded part property, or a combination thereof.

6. The assembly of claim 1, wherein the plurality of first fingers have a first triangular cross-section, wherein the plurality of second fingers have a second triangular cross-section and wherein the first triangular cross-section and the second triangular cross-section are complimentary.

7. The assembly of claim 6, wherein the first triangular cross-section and the second triangular cross-section have a base length (X), a side length (Y), a base width (Z), and a height (H).

8. The assembly of claim 1, further comprising:
   a plurality of first finger sections about the first bonding area, each first finger section having first fingers aligned with each other within the same first finger section; and
   a plurality of second finger sections about the second bonding area, each second finger section having second fingers aligned with each other within the same second finger section.

9. The assembly of claim 8, wherein the first fingers of each first finger section are aligned with their corresponding second fingers of each second finger section.

10. The assembly of claim 1, wherein a finger direction of the plurality of first fingers is based on a position of the plurality of first fingers about the first bonding area and a finger direction of the plurality of second fingers is based on a position of the plurality of second fingers about the second bonding area.

11. The assembly of claim 10, wherein the finger direction extends perpendicularly from an inner bonding area side.

12. The assembly of claim 1, wherein each finger of the plurality of first fingers are spaced apart from adjacent first fingers in the first bonding area and wherein each finger of the second plurality of fingers are spaced apart from adjacent second fingers in the second bonding area.

13. A method for assembling injection molded parts, the method comprising:
   injection molding a first part with a plurality of first fingers extending from a surface of a first bonding area;
   injection molding a second part with a plurality of second fingers extending from a surface of a second bonding area;
   placing adhesive tape in an unstretched condition across a top surface of either the plurality of first fingers or the plurality of second fingers; and
   pressing the plurality of first fingers and the plurality of second fingers into engagement with the adhesive tape disposed therebetween including stretching the adhesive tape to a stretched condition under tensile stress into a plurality of first valleys corresponding to the plurality of first fingers and a plurality of second valleys corresponding to the plurality of second fingers to assemble the first injection molded part and second injection molded part together, wherein the adhesive tape in the stretched condition has a greater surface area compared to the adhesive tape in the unstretched condition to enhance engagement with the surfaces of the first and second bonding areas including the plurality of first fingers and the plurality of second fingers to increase bonding strength.

* * * * *